United States Patent
Fang et al.

(10) Patent No.: US 10,719,057 B2
(45) Date of Patent: Jul. 21, 2020

(54) METHOD AND APPARATUS FOR SUPPRESSION OF SPIKES DETECTED BY A PROXIMITY SENSOR

(71) Applicant: Metrix Instrument Co., LP, Houston, TX (US)

(72) Inventors: Frank Fang, Houston, TX (US); Everett Jesse, Houston, TX (US); Matthew Webster, Houston, TX (US)

(73) Assignee: METRIX INSTRUMENT CO., LP, Houston, TX (US)

( * ) Notice: Subject to any disclaimer, the term of this patent is extended or adjusted under 35 U.S.C. 154(b) by 24 days.

(21) Appl. No.: 16/213,400

(22) Filed: Dec. 7, 2018

(65) Prior Publication Data

US 2019/0179281 A1 Jun. 13, 2019

Related U.S. Application Data

(60) Provisional application No. 62/596,479, filed on Dec. 8, 2017.

(51) Int. Cl.
*G05B 19/042* (2006.01)
*G08B 21/18* (2006.01)
*D06F 33/00* (2020.01)

(52) U.S. Cl.
CPC ......... *G05B 19/0428* (2013.01); *D06F 33/00* (2013.01); *G08B 21/182* (2013.01); *G05B 2219/21003* (2013.01); *G08B 21/187* (2013.01)

(58) Field of Classification Search
CPC ............... D06F 33/00; G05B 19/0428; G05B 2219/21003; G08B 21/182; G08B 21/187
See application file for complete search history.

(56) References Cited

U.S. PATENT DOCUMENTS 5,669,151 A * 9/1997 Collingwood ......... G01B 7/002
33/558
6,289,735 B1 9/2001 Dister et al.
(Continued)

OTHER PUBLICATIONS

Bilosova et al., "Vibration Diagnostics." Ostrava, 2012 (2012) Retrieved on Feb. 10, 2019 from https://www.fs.vsb.cz/export/sites/fs/330/.content/files/VIBDI_skriptaEN.pdf.
(Continued)

*Primary Examiner* — Abdelmoniem I Elamin
(74) *Attorney, Agent, or Firm* — Hoffmann & Baron, LLP

(57) ABSTRACT

A method for suppressing a non-periodic random event in a proximity system includes: receiving an output signal generated by a proximity sensor in the proximity system and monitoring at least a magnitude of the output signal; determining whether a spike having a magnitude exceeding a prescribed threshold value has occurred in the output signal; when a spike in the output signal is detected, setting an output of the proximity system to a prescribed level for a prescribed duration of time; when the prescribed duration of time has elapsed, determining whether the output signal meets one or more prescribed criteria indicative of a shutdown condition; when it is determined that the output signal meets the prescribed criteria, setting the output of the proximity system to a level exceeding an alarm threshold; and when it is determined that the output signal fails to meet at least one of the prescribed criteria, releasing suppression of the output of the proximity system.

20 Claims, 9 Drawing Sheets

(56) References Cited

U.S. PATENT DOCUMENTS

| | | | | |
|---|---|---|---|---|
| 7,184,930 | B2* | 2/2007 | Miyasaka | B61F 15/20 |
| | | | | 246/169 A |
| 7,768,258 | B2 | 8/2010 | Dobsky | |
| 9,185,779 | B2* | 11/2015 | Murakami | F21V 23/0471 |
| 9,475,404 | B2* | 10/2016 | Nakatsu | B60L 15/2045 |
| 9,723,158 | B2* | 8/2017 | Middleton | G01H 17/00 |
| 9,850,084 | B2* | 12/2017 | Middleton | H04N 1/00007 |
| 10,345,056 | B2* | 7/2019 | Rollins | F04D 27/004 |
| 10,488,984 | B2* | 11/2019 | Nishi | G06F 3/0416 |
| 2007/0118333 | A1* | 5/2007 | Miyasaka | B61F 15/20 |
| | | | | 702/183 |
| 2007/0250245 | A1* | 10/2007 | van der Merwe | F01D 21/003 |
| | | | | 701/100 |
| 2008/0054891 | A1 | 3/2008 | Dobsky | |
| 2013/0309060 | A1 | 11/2013 | Johnsen | |
| 2018/0058463 | A1* | 3/2018 | Rollins | F28F 27/003 |
| 2019/0120811 | A1* | 4/2019 | Luneau | G01N 33/343 |
| 2019/0293371 | A1* | 9/2019 | Rollins | F04D 25/06 |

OTHER PUBLICATIONS

Ferrando Chacon, "Fault Detection in Rotating Machinery Using Acoustic Emission." In: Diss. Brunel University London. Oct. 2015. Retrieved on Feb. 10, 2019 from https://bura.brunel.ac.uk/handle/2438/11510.

International Search Report and Written Opinion dated Mar. 18, 2019.

Metrix—Monitor Thrust, Radial Vibration or Shaft Speed, Metrix Instrument Co., Houston, TX, pp. 1-4 (Jan. 2016).

\* cited by examiner

METHOD AND APPARATUS FOR SUPPRESSION OF SPIKES DETECTED BY A PROXIMITY SENSOR

CROSS-REFERENCE TO RELATED APPLICATIONS

This application claims the benefit of U.S. Provisional Patent Application No. 62/596,479 filed on Dec. 8, 2017, the complete disclosure of which is expressly incorporated herein by reference in its entirety for all purposes.

FIELD

The present invention relates generally to electrical machines, and more particularly, to proximity sensing used to monitor vibration in rotating machinery.

BACKGROUND

Rotating machinery, including motors, generators and the like, are widely used in manufacturing, power generation and materials processing, among other applications. Due at least in part to the extended duration of use and high rotational speeds (e.g., revolutions per minute (RPM)) at which industrial rotating machines typically operate, such machines are subject to wear and potential failure. In order to minimize catastrophic damage, the machines are often taken offline to perform scheduled maintenance, such as lubrication and/or replacement of parts, as a precaution. However, such preventative machinery maintenance can be costly, in terms of facility downtime and replacement parts and labor expenses.

Consequently, it has become more cost-effective to monitor the operational status of rotating machinery using such metrics as machine vibration to provide an indication of its condition. One type of condition monitoring device is a two-wire proximity transmitter system that converts a non-linear eddy current signal, obtained from a suitable current probe, into a linearized output suitable for conversion into a standard 4 to 20 milliamp (mA) direct current (DC) signal typically used in modern industrial instrumentation systems. This signal is used to indicate whether a portion of a rotating machine (e.g., a motor or compressor) is in need of repair or maintenance. The signal may also be used to provide protection to the machine by triggering an alarm indicating vibration levels that exceed a prescribed threshold, thereby allowing an external control system or other mechanism to shut down the machine before the occurrence of a catastrophic failure.

Unfortunately, there may be events detected which could trigger an alarm, but which may be a spurious spike generated by a non-vibration induced random occurrence; in effect, a false alarm. For example, if a metallic particle breaks loose from the machine and travels between the target and the probe of a proximity sensor via, for example, lubricating oil, a non-periodic, random spike may be generated by the proximity transmitter system. Such an event generally resolves itself without a need to shut down the machine.

SUMMARY

The present invention, in one or more embodiments, is directed to a method, apparatus and/or system for suppressing a non-periodic spike which is indicative of a non-vibration induced random event recorded by a proximity system (e.g., a digital proximity system (DPS)). Thus, when a non-periodic spike occurs which is indicative of a non-vibration induced random event, an irregular, non-symmetric pattern can be observed in an output of the proximity system. In accordance with an aspect of embodiments of the invention, this irregular pattern is detected and evaluated by a processor which is then configured to suppress the spike when one or more prescribed criteria are met. In this manner, the non-vibration induced event is beneficially allowed to resolve itself without generating an alarm and without the need to take further action, such as shutting down the machinery.

In accordance with one embodiment, a method for suppressing a non-periodic random event in a proximity system includes: receiving an output signal generated by a proximity sensor in the proximity system and monitoring at least a magnitude of the output signal; determining whether a spike having a magnitude exceeding a prescribed threshold value has occurred in the received output signal; when a spike in the received output signal is detected, setting an output of the proximity system to a prescribed level for a prescribed duration of time; when the prescribed duration of time has elapsed, determining whether the output signal generated by the proximity sensor meets one or more prescribed criteria indicative of a shutdown condition; when it is determined that the output signal generated by the proximity sensor meets said prescribed criteria indicative of a shutdown condition, setting the output of the proximity system to a level exceeding an alarm threshold of the proximity system; and when it is determined that the output signal generated by the proximity sensor fails to meet at least one of said prescribed criteria, thereby indicating that the spike in the output signal generated by the proximity sensor was caused by a non-vibration induced random event, releasing suppression of the output of the proximity system.

In accordance with another embodiment, an apparatus for suppressing a non-vibration induced event recorded by a proximity system includes memory and at least one processor coupled with the memory. The processor is configured: to receive an output signal generated by a proximity sensor in the proximity system and monitoring at least a magnitude of the output signal; to determine whether a spike having a magnitude exceeding a prescribed threshold value has occurred in the received output signal; to set an output of the proximity system to a prescribed level for a prescribed duration of time when a spike in the received output signal is detected; to determine whether the output signal generated by the proximity sensor meets one or more prescribed criteria indicative of a shutdown condition when the prescribed duration of time has elapsed; to set the output of the proximity system to a level exceeding an alarm threshold of the proximity system when it is determined that the output signal generated by the proximity sensor meets said prescribed criteria indicative of a shutdown condition; and to release suppression of the output of the proximity system when it is determined that the output signal generated by the proximity sensor fails to meet at least one of said prescribed criteria, thereby indicating that the spike in the output signal generated by the proximity sensor was caused by a non-vibration induced random event.

As may be used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques according to embodiments of the present invention can provide substantial beneficial technical effects. By way of example only and without limitation, one or more embodiments provide techniques for suppressing a non-vibration induced event recorded by a digital proximity system having one or more of the following advantages, among other benefits:
- an ability to eliminate or reduce the likelihood of false alarms that might otherwise result in a shutdown of the machinery;
- compatible with a standard 4-20 mA DC output used by modern industrial instrumentation systems;
- an ability for a user to define certain criteria for suppressing non-vibration induced events, such as spike duration and vibration shutdown level;
- an ability to provide additional information for diagnostics, such as, but not limited to, a trigger in a rack-based machine monitoring system.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative apparatus, systems and methods for suppressing an alarm condition generated by a non-vibration induced spike or event occurring in a rotating machine, as may be detected by a digital proximity system (DPS). It is to be appreciated, however, that the invention is not limited to the specific apparatus, systems and/or methods illustratively shown and described herein. Rather, it will become apparent to those skilled in the art given the teachings herein that numerous modifications can be made to the embodiments shown that are within the scope of the claimed invention. That is, no limitations with respect to the embodiments shown and described herein are intended or should be inferred.

A digital proximity system (DPS) including proximity probe sensors can be used to monitor vibrations in motors and shafts of rotating machines to identify potential problems. An exemplary digital proximity system is disclosed in U.S. Pat. No. 7,768,258 (hereinafter "the '258 patent"), entitled "Proximity Probe Transmitter," the disclosure of which is incorporated herein by reference. As described in the '258 patent, with reference to FIGS. 1A and 1B for example, the proximity probe sensor utilizes eddy current probe displacement monitoring which includes one or more eddy current probes disposed in close relative proximity to a target surface to be monitored, such as a shaft of a rotating machine.

Figure 1:
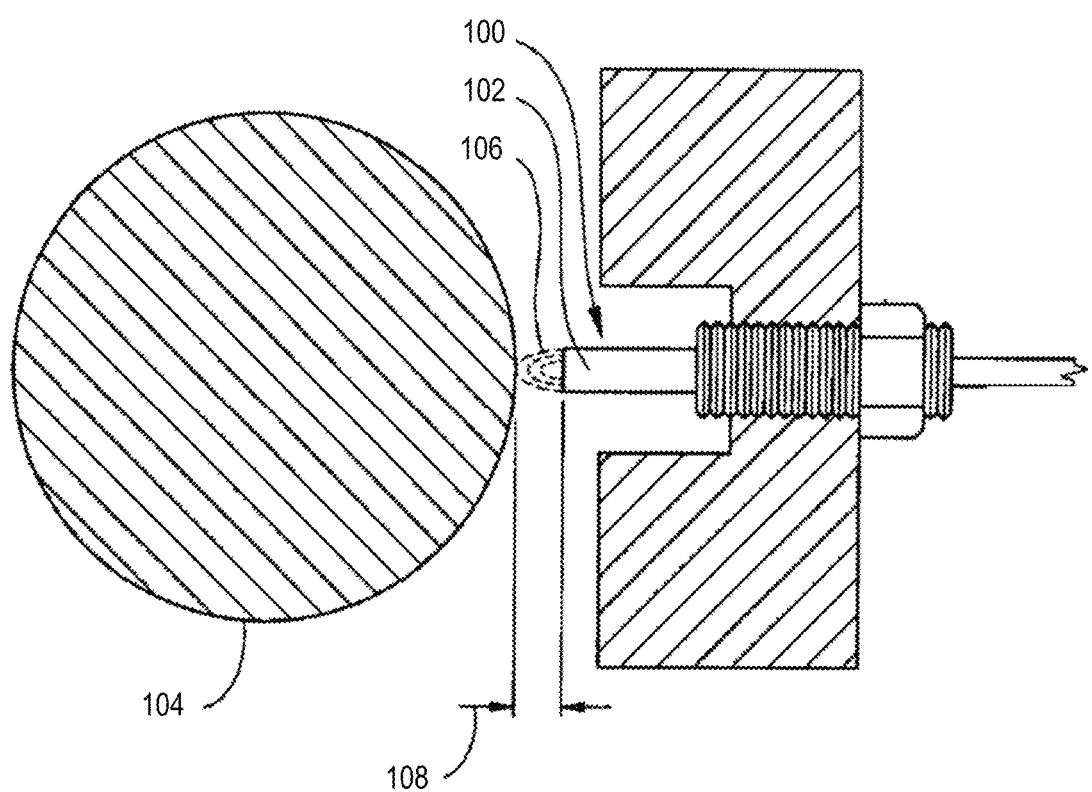
FIG. 1 depicts at least a portion of an exemplary eddy current probe suitable for use in conjunction with one or more embodiments of the present invention.

FIG. 1 depicts at least a portion of an exemplary eddy current probe 100 suitable for use in conjunction with one or more embodiments of the invention. The eddy current probe 100 preferably includes a coil 102 at an end closest to a target surface 104 being monitored. Although the target surface 104 is typically a rotatable motor shaft, it is to be understood that the target surface may similarly comprise any moving target for which vibration or position monitoring is sought. When excited by an external radio frequency (RF) signal, the probe coil 102 generates an electromagnetic field 106 which penetrates the target surface/material 104 and, assuming the target material is conductive, this electromagnetic field will induce eddy currents in the target material. These eddy currents will produce their own electromagnetic field that will affect an impedance of the probe coil. The magnitude of the eddy currents will be a function of a gap size 108 between the probe coil 102 and the target surface 104, and thus the impedance of the probe coil will also be dependent on the gap size. Measurements of the impedance of the probe coil 102 may be correlated with the size of the gap 108, which can then be used to determine a relative position of the target surface 104.

Multiple current probes (not explicitly shown, but implied), for example disposed radially and axially relative to the target surface 104, can be used to increase an accuracy of the target surface position information output provided by the proximity probe sensor. In this manner, three-dimensional position information (i.e., in multiple axes) can be beneficially obtained.

Figure 2:
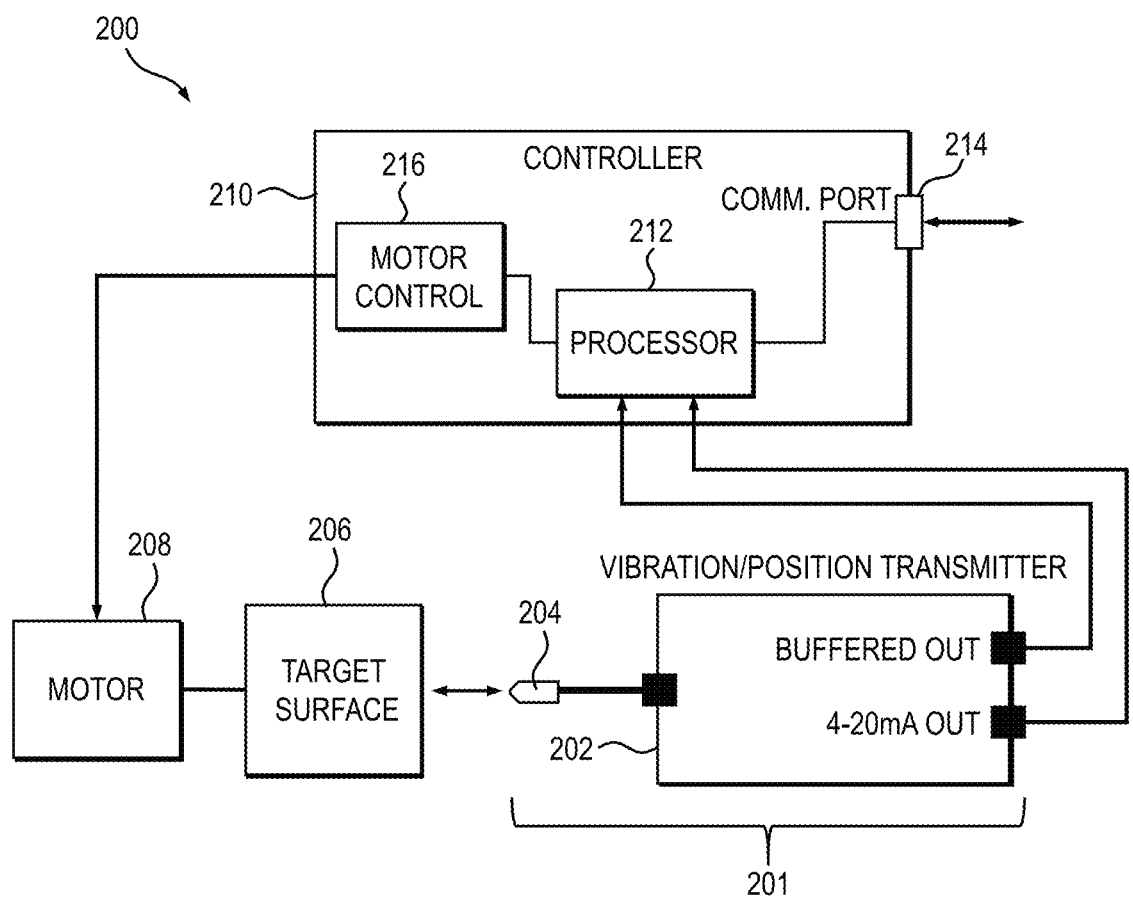
FIG. 2 is a block diagram conceptually depicting at least a portion of an exemplary position monitoring system, which can be utilized in conjunction with one or more embodiments of the present invention.

FIG. 2 is a block diagram conceptually depicting at least a portion of an exemplary digital control system (DCS) 200, which can be utilized in conjunction with one or more embodiments of the invention. The DCS 200 includes a position monitoring apparatus 201 comprising a vibration/position transmitter 202 operatively coupled to one or more eddy current probe(s) 204. Although not explicitly shown but implied, the vibration/position transmitter 202 preferably comprises an oscillator that supplies the RF signal for exciting the probe coil in the eddy current probe 204 via a cable or similar connection means. The cable and current probe form a resonant circuit which, when driven by the oscillator at its resonant frequency, will exhibit a purely resistive load impedance. However, as eddy current induced changes in the probe/cable load impedance occur, a corresponding change in voltage output of the probe will result. This output voltage can be monitored to detect changes in position, such as vibration, of a target surface 206 disposed in close relative proximity to the current probe 204. The target surface 206 may be, in one or more embodiments, a shaft which is rotated or moved by a motor 208.

The vibration/position transmitter 202, in one or more embodiments, is configured to generate a buffered output voltage signal and a 4-20 mA output current signal indicative of a position of the current probe 204 relative to the target surface 206. These output signals are supplied to a controller 210, included in the DCS 200, which is configured to monitor the outputs generated by the vibration/position transmitter 202 and compare such outputs to one or more prescribed criteria to determine what action(s) to take, if any, in response to the prescribed criteria detected in the outputs. In one or more embodiments, the buffered output voltage and 4-20 mA output current signals are supplied to a processor 212 in the controller 210. When the processor 212 detects a change in position of the target surface 206 being monitored relative to the current probe 204 exceeding a prescribed threshold, the processor preferably generates a first output signal, which may be an alarm signal, that can be transmitted to an external system component via a communications port 214 included in the controller 210. Additionally, the processor 212 preferably generates a second output signal which is supplied to a motor control module or circuit 216 in the controller 210. The motor control module 216, in response to receiving the second output from the processor 212, is configured to shut down the motor 208 to prevent damage thereto.

Figure 3:
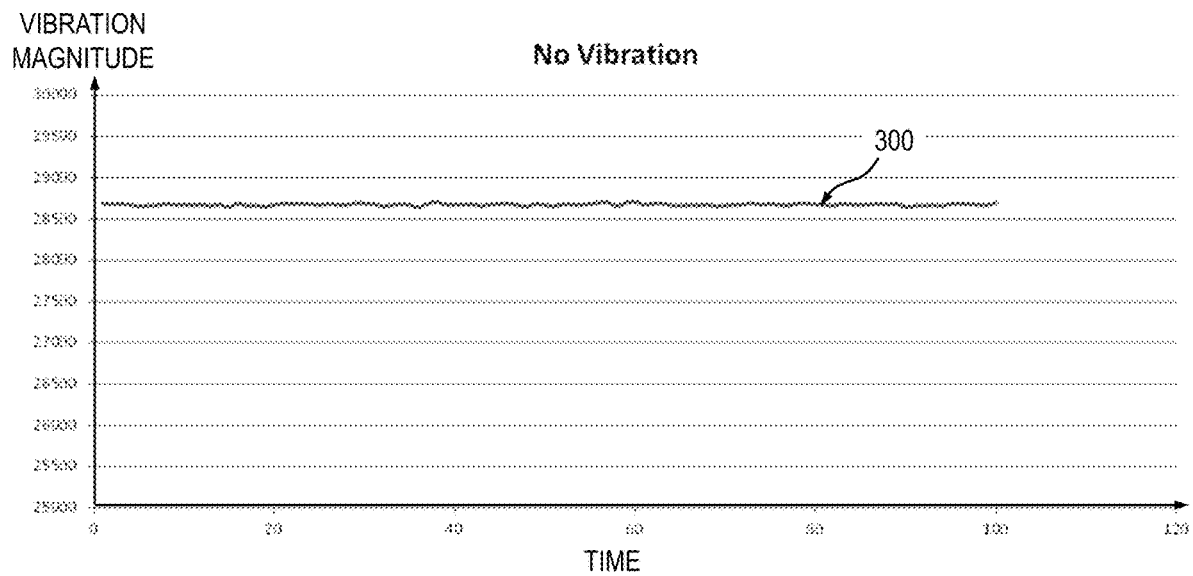
FIGS. 3-5 depict illustrative waveforms representing an output signal generated by the vibration/position transmitter shown in FIG. 2 for various detected conditions.
Figure 4:
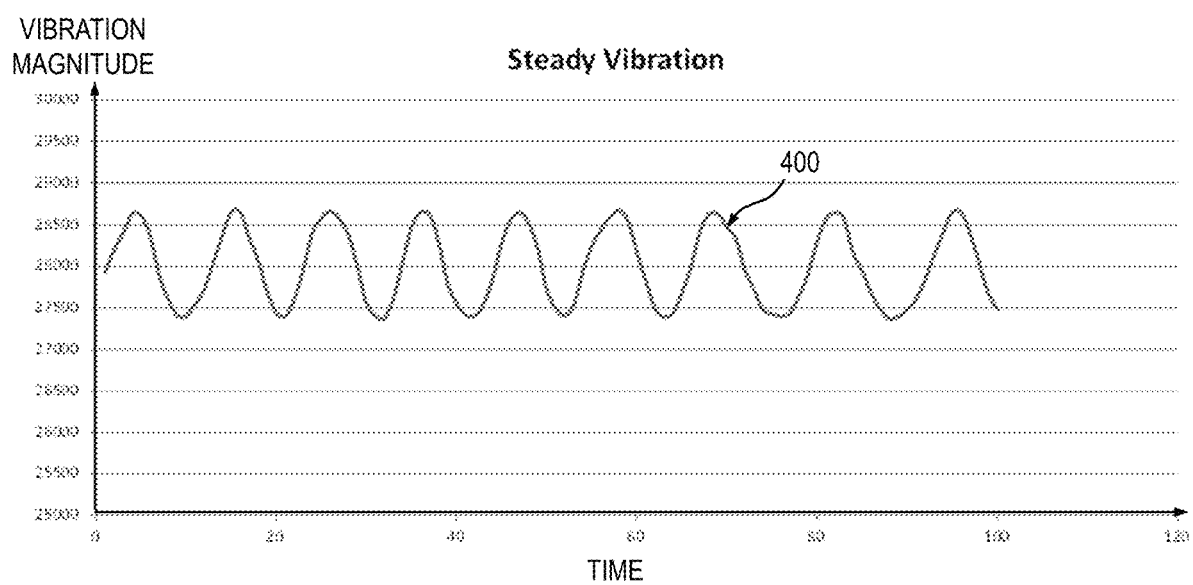
Figure 5:
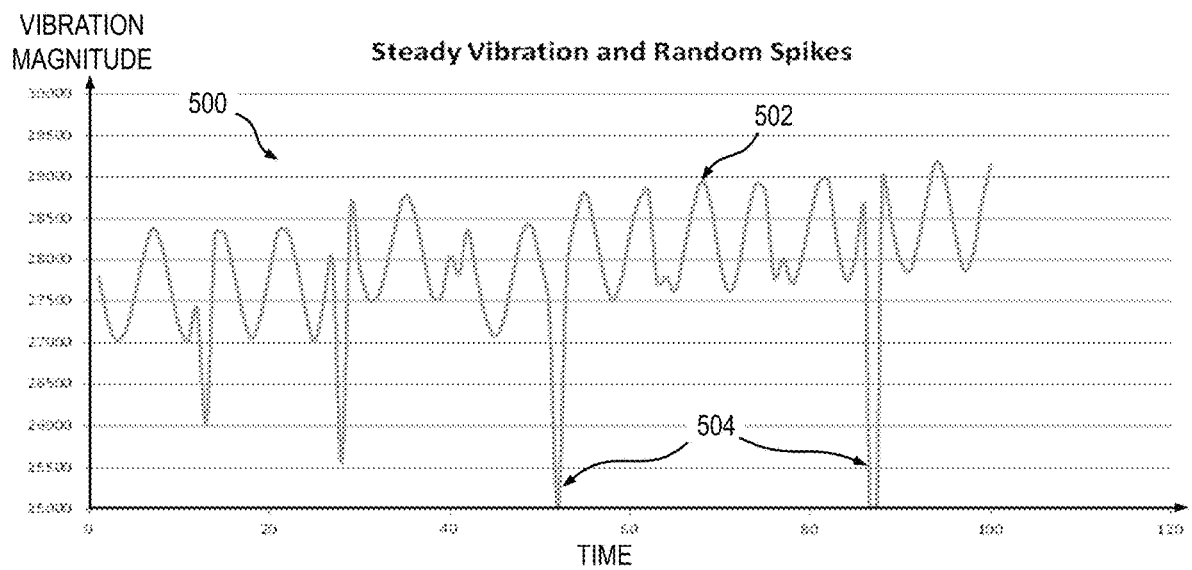

With reference now to FIGS. 3-5, illustrative waveforms 300, 400 and 500, respectively, are shown representing the output signal generated by the exemplary vibration/position transmitter 202 shown in FIG. 2 for various detected conditions. The y-axis units used in FIGS. 3-5 are analog-to-digital converter (ADC) raw values (i.e., counts) that equate to a magnitude of the signal being measured. Consequently, this y-axis is referred to herein as measuring vibration magnitude. The x-axis units used in FIGS. 3-5 are relative time units, referred to simply as time.

As apparent from FIG. 3, the waveform 300 is substantially constant, which is indicative of the output signal of the vibration/position transmitter 202 detecting essentially no vibration in the target surface being monitored. In FIG. 4, the output signal of the vibration/position transmitter 202 exhibits a periodic sinusoidal waveform 400 indicative of a steady vibration detected in the target surface. Whether or not this steady vibration is a precursor to imminent failure of the rotating machine associated with the target surface will be, to at least some extent, dependent on a peak-to-peak amplitude of the waveform 400 exceeding a prescribed threshold level.

In FIG. 5, the output signal of the exemplary vibration/position transmitter 202 exhibits a waveform 500 which is comprised of a periodic sinusoidal component 502, indicative of a steady vibration in the target surface being monitored (e.g., caused by a vibration in the rotating machine), and one or more non-periodic spurious spikes 504, generated by non-vibration induced random events. The spikes 504 generally represent high amplitude electrical noise, mechanical vibration, RF interference, or the like, typically originating externally to the position monitoring apparatus 201 and are uncorrelated to a vibration of the target surface. By way of example only and without limitation, a random spike 504 may be other generated when a metallic particle breaks loose from the machine and travels between the target surface 206 and the current probe 204 of the position monitoring system 200 (see FIG. 2) via lubricating oil, or another mechanism (e.g., airborne metal particles). These random spikes 504 may exceed the prescribed threshold to thereby trigger an alarm condition resulting in machine shutdown, but are otherwise unrelated to a vibration of the target surface that would produce a failure in the rotating machine. These erroneous signals (i.e., false alarms) caused by such random events typically resolve on their own, without the need for preventative action.

In order to eliminate or at least reduce the likelihood of false alarms caused by non-periodic spurious spikes/noise generated by non-vibration induced random events, aspects of the invention beneficially provide a method, apparatus and/or system for suppressing erroneous non-periodic signals caused by such non-vibration induced random events, as may be recorded by a digital proximity system or other position monitoring system. Although described herein with reference to a digital proximity system, it is similarly contemplated that aspects of the present invention may be used in conjunction with other proximity detection systems, including an analog proximity system, as will become apparent to those skilled in the art given the teachings herein.

In accordance with one or more embodiments, a processor (e.g., processor 212 shown in FIG. 2) is configured to receive a current output signal (e.g., a standard 4-20 mA DC output) and/or a voltage output signal generated by a vibration/position transmitter (e.g., 202 shown in FIG. 2) and, based on prescribed criteria to which the current output signal and/or voltage output signal is compared, to determine whether a detected spike in the signal is characteristic of a non-periodic, non-vibration induced random event which should be suppressed, or whether it is characteristic of a periodic vibration which should not be suppressed. Prescribed criteria which may be used by the processor to determine whether to suppress the detected spike may include, for example, an amplitude of the detected spike, a duration of the spike, and/or external requirements of the system with respect to monitoring criteria and shutdown thresholds, among other parameters. The criteria used to determine whether to suppress the spike specifically excludes the frequency of occurrence of the non-vibration induced random event, since this suppression methodology is not a frequency analysis of a vibration signal.

The spike/noise suppression feature according to one or more embodiments of the invention is used to advantageously inhibit high amplitude electrical noise generated externally to the vibration/position transmitter from influencing the performance of the position monitoring system. In one or more embodiments, this feature temporarily suppresses high amplitude, short duration (e.g., less than about 50 milliseconds (ms)) noise spikes. When this feature is enabled (e.g., selected by a user), noise spikes exceeding a prescribed threshold level, which may be full-scale range or some lesser value selected by the user, will be suppressed for a prescribed duration, which may be about 50 ms or some other time specified by the user (e.g., up to 1 sec).

Figure 6:
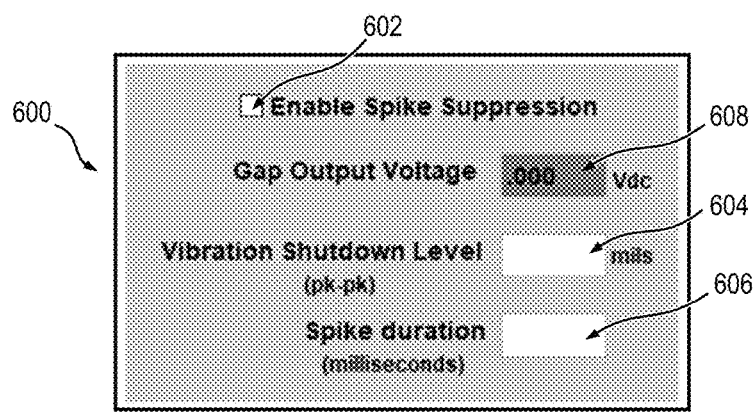
FIG. 6 is an illustrative graphical user interface through which certain parameters for controlling one or more aspects of a position monitoring system may be selected by a user, according to an embodiment of the present invention.

In some embodiments, a graphical user interface (GUI) may be presented to the user for inputting one or more parameters used by the system to enable the spike suppression feature and/or customize certain aspects affecting how spike suppression is implemented by the system. For example, FIG. 6 is an illustrative graphical user interface 600 through which certain parameters for controlling one or more aspects of the position monitoring system may be selected by a user, according to an embodiment of the invention. The graphical user interface 600 includes an "Enable Spike Suppression" selection box 602 which allows the user to enable or disable spike suppression in the position monitoring system. Vibration shutdown level (e.g., in mils) may be set by the user via a "Vibration Shutdown Level" selection box 604. The user may also set an acceptable duration of the spike (e.g., in milliseconds) via a "Spike Duration" selection box 606. Optionally, a read-only gap output voltage may be presented to the user in box 608; this value is not programmable by the user.

Figure 7:
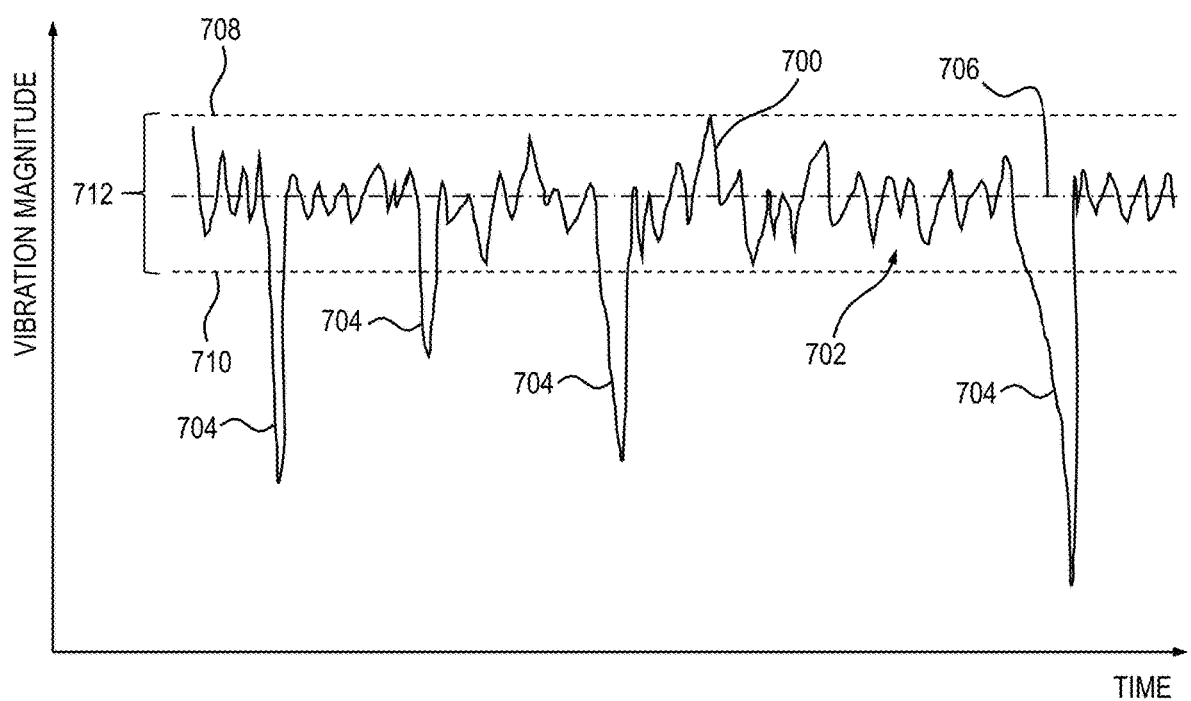
FIG. 7 graphically depicts an exemplary waveform representative of an output signal generated by the vibration/position transmitter shown in FIG. 2.

FIG. 7 depicts an exemplary waveform 700 representative of an output signal (e.g., voltage output or other dynamic output) generated by a vibration/position transmitter (e.g., 202 in FIG. 2). The waveform 700 indicates that the output signal includes a substantially periodic, symmetrical component 702, which is indicative of a steady vibration of the target surface being monitored, and one or more non-periodic, non-symmetrical random noise spikes 704, indicative of non-vibration induced random events (i.e., events uncorrelated to a vibration of the target surface). The periodic component 702 of the output signal is generally symmetrical about a baseline 706 and exhibits peaks on either side of the baseline (i.e., above and below the baseline). An upper amplitude boundary 708 and a lower amplitude boundary 710 of the output signal define a normal (i.e., balanced) vibration range 712 for the target surface of the rotating machine. The normal vibration range 712 may be fixed based on prescribed operating specifications of the rotating machine or other criteria (e.g., supply voltage, temperature, load, etc.), or it may be controllable by the user based on an acceptable vibration tolerance for the rotating machine, among other factors.

The spikes 704 appearing in the waveform 700 may be attributable to, for example, metal fragments that often dislodge from machine components and touch either the current probe tip or the target surface. These metal fragments typically do not affect the operation of the machine. The spikes, alternatively, may be attributable to electrical noise generated externally to the vibration/position transmitter. Without spike suppression enabled, however, the non-symmetrical random spikes 704 indicative of non-vibration induced random events exceeding an amplitude defined by the normal vibration range 712 will trigger an alarm resulting in a shutdown of the rotating machine, even though these detected events are attributable to random noise which is unrelated to a vibration of the machine; i.e., a false alarm.

In accordance with one or more embodiments of the invention, false alarms are beneficially eliminated, or at least significantly reduced, by suppressing the 4-20 mA current output signal of the vibration/position transmitter (e.g., 202 in FIG. 2) when a spike indicative of a non-vibration induced random event is detected, such as by a processor (e.g., 212 in FIG. 2) in a digital proximity system (DPS). As previously stated, although reference may be made herein to a digital proximity system, it is to be appreciated that aspects of the invention can be similarly employed in other proximity systems, including an analog proximity system (e.g., as a bolt on a digital "block"). Although some vibration/position transmitters have the ability to output both voltage and current, in one or more embodiments the voltage output is preferably left unchanged but the current output is modified to suppress the spike. In the vibration/position transmitter, the voltage output is essentially a real-time signal while the current output is preferably time averaged, and may include hysteresis. Accordingly, the current output is not necessarily indicative of a real-time output of the current probe (i.e., proximity sensor).

Aspects according to embodiments of the present disclosure are described herein based on several assumptions. First, the digital proximity system voltage output is obtained from buffered linear data, which is a mapped result from non-linear data processed by the digital proximity system. The buffered linear data is further processed to generate the 4-20 mA current output (e.g., based on mapping a percentage of full scale voltage output level to discrete current output levels), and thus the spike suppression methodology according to one or more embodiments is preferably performed in conjunction with the processing of the current output signal. Second, the suppression is applied only when a spike is identified, and during a normal (balanced) vibration condition, the output is not affected. Furthermore, activation of the suppression feature is preferably selectively enabled or disabled by the user as desired. Thus, when the user disables spike suppression in the digital proximity system, the processor allows spikes and other noise components to pass through to the current output unaffected. By default, spike suppression may be disabled by the processor during factory calibration, in one or more embodiments. The user would then run a software application (e.g., Metrix DPS 1.35, manufactured by Metrix Instrument Co.) to enable the suppression feature.

An important aspect of the spike suppression feature according to one or more embodiments of the invention is proper identification of a spike or other noise representing a non-vibration induced random event. In theory, any touching of a metal fragment or the like on either the current probe tip or the target surface will cause the buffered output signal to sharply decrease from its balanced level (e.g., outside of the normal vibration range 712 shown in FIG. 7). Other sources of noise may also cause the buffered output signal to change sharply, including RF noise, random mechanical vibration, etc. Thus, an unbalanced dip in the buffered output level can be used to identify a spike indicative of a non-vibration induced random event. The same principle can be applied when the buffered output signal sharply increases from its balanced level.

The processor (e.g., 212 in FIG. 2), in one or more embodiments, is configured to continuously and dynamically track the balanced buffered value and compare a real-time measurement of the output signal generated by the vibration/position transmitter (e.g., 202 in FIG. 2) against this value. This buffered value is preferably stored in the position monitoring system, for example in memory coupled with the processor. When an unbalanced signal is detected by the processor and the prescribed threshold, either preset or user-defined (e.g., via user selection of parameters through the GUI 600 in FIG. 6), is reached, the 4-20 mA current output will be suppressed to a prescribed output value. Concurrently, the digital proximity system keeps track of a duration of the spike and releases the suppression when the duration of the spike exceeds a prescribed time period, either preset or user-defined (e.g., via selection box 606 in FIG. 6).

Figure 8:
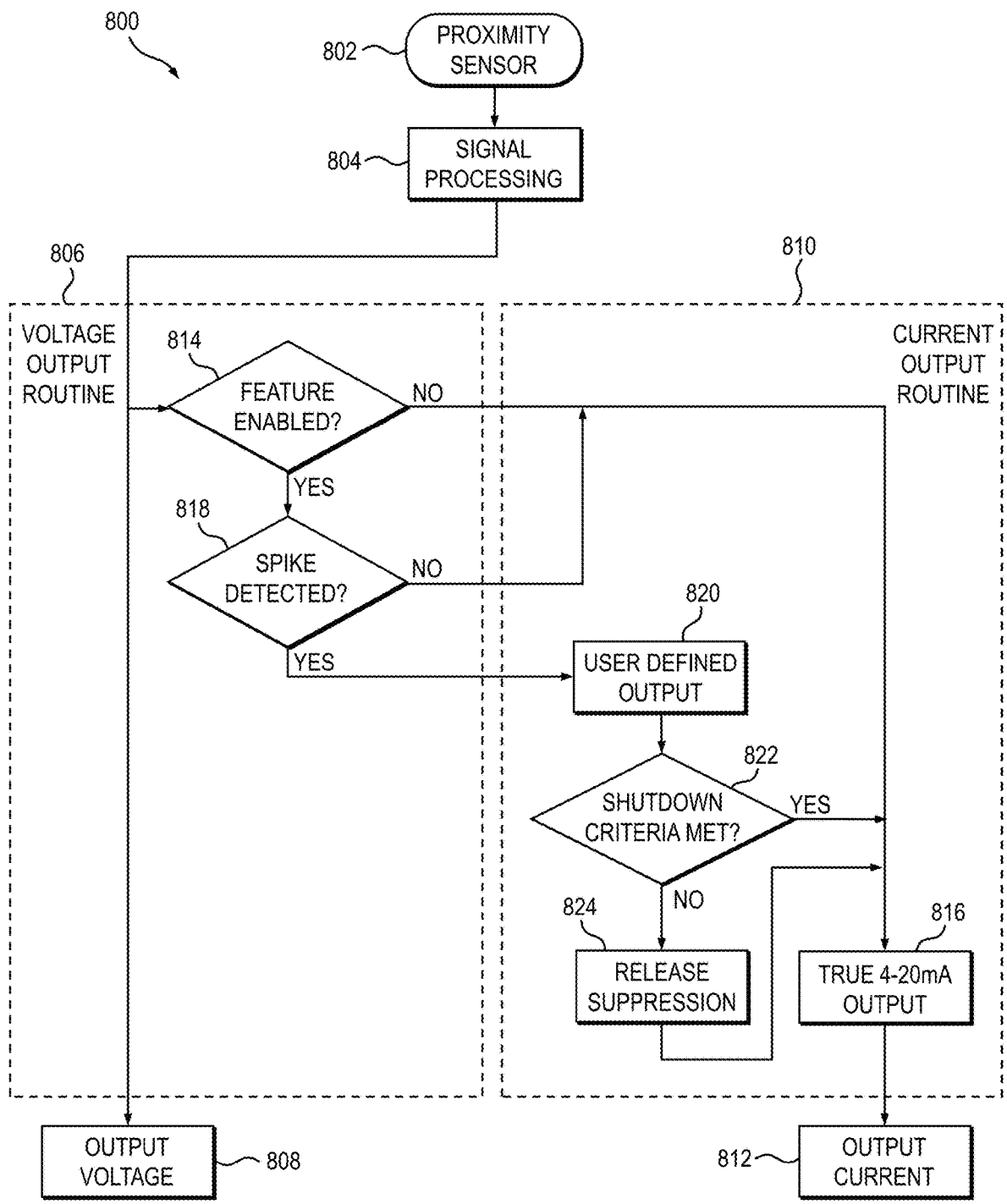
FIG. 8 is a flow diagram depicting at least a portion of an exemplary method for suppressing non-periodic noise spikes detected in a current output signal of a digital proximity system that are indicative of non-vibration induced random events, according to an embodiment of the invention.

With reference now to FIG. 8, a flow diagram depicts at least a portion of an exemplary method 800 for suppressing non-periodic spikes detected in a current output signal of a digital proximity system that are indicative of non-vibration induced random events, according to an embodiment of the invention. As previously stated, a non-vibration induced random event may be attributable to, for example, at least one of high amplitude electrical noise, mechanical vibration, RF interference, metal fragments, etc., that is uncorrelated to a vibration of the target surface being monitored. In accordance with the illustrative method 800, a proximity sensor, such as, but not limited to, a current probe (e.g., 204 in FIG. 2), generates at least one analog output signal in step 802. This analog output signal, which is indicative of a position of a target surface to be monitored relative to the proximity sensor, is processed in step 804, such as by a digital signal processor (DSP) which may reside in the vibration/position transmitter (e.g., 202 in FIG. 2). In one or more embodiments, the DSP is configured to convert the analog proximity signal, generated by the proximity sensor in step 802, into a digital representation of the proximity signal. The processing performed in step 804 may include linearizing and/or scaling the proximity signal to provide enhanced resolution for various proximity sensor types that may be employed, as will become apparent to those skilled in the art.

A voltage output routine 806 performed by the method 800 is operative to generate an output voltage in step 808 which comprises a dynamic, real-time signal (e.g., dynamic voltage output) generated by the signal processing step 804. This real-time output voltage is thus indicative of a proximity of the target surface to the proximity sensor, and may comprise a noise component(s) as well which is unrelated to a vibration of the target surface, as previously explained. In one or more embodiments, the output voltage of the position monitoring system is unaffected by the spike/noise suppression feature, as previously stated. Similarly, a current output routine 810 is operative to generate an output current in step 812, which may be a buffered, time-averaged current signal indicative of the output voltage. In one or more embodiments, the output current signal comprises a 4-20 mA current output based on mapping a percentage of full-scale voltage output (e.g., generated by a vibration/position transmitter) to discrete current output levels. The output current signal may comprise a prescribed amount of hysteresis, and thus the output current is not necessarily a real-time signal.

In step 814, the method 800 checks to see whether or not the spike suppression feature has been enabled. As previously stated, the user, in one or more embodiments, can selectively enable or disable spike/noise suppression as desired, such as, for example, by way of a selection parameter in a graphical user interface (e.g., GUI 600 in FIG. 6) or other input mechanism. When the suppression feature is not enabled, the method 800 proceeds to step 816 where the true 4-20 mA current signal is used as the output current generated by the position monitoring system in step 812.

When step 814 determines that suppression has been enabled, program control proceeds to step 818, where the method 800 is configured to determine whether or not a spike has been detected in the output signal generated by the signal processing step 804. At this point, the method 800 has not determined a source of the spike; that is, whether the spike was caused by a non-vibration induced random event (e.g., high amplitude electrical noise, RF interference, metal fragments, mechanical vibration from a source not associated with the rotating machine being monitored, etc.) unrelated to a vibration of the target surface being monitored (and thus should be suppressed), or whether the spike is indicative of a potential failure in the motor associated with the target surface being monitored (and thus a shutdown should occur). Spike detection may be performed, for example, by comparing a magnitude of the output proximity signal generated by the signal processing step 804 with a prescribed threshold level to determine whether the signal has exceeded the threshold level.

With continued reference to FIG. 8, when no spike has been detected in the output signal, program control proceeds to step 816, where the true 4-20 mA current signal is used as the output current without modification. Alternatively, when a spike is detected in step 818, the output current is set to a prescribed level (e.g., 2.8 mA), which is preferably different from a normal vibration current level and less than full-scale, for a prescribed duration (e.g., 0.25 sec). The prescribed duration of time during which the output current signal is set to the prescribed level may be programmed by the user, such as via a graphical user interface (e.g., GUI 600 in FIG. 6).

After the prescribed duration in step 820 has elapsed, the output signal generated by the signal processing step 804 is checked in step 822 to determine whether one or more prescribed shutdown criteria have been met. In one or more embodiments, the shutdown criteria comprises a magnitude and duration of the detected spike. When the shutdown criteria have been met, the method 800 assumes that the detected spike was attributable to an actual shutdown condition (as opposed to a transient event), and the method proceeds to use the true 4-20 mA current signal in step 816, which will generate a full-scale output current in step 812. Alternatively, when the shutdown criteria have not been met, as determined in step 822, the method 800 assumes that the detected spike was generated by a transient (e.g., random) event unrelated to a vibration of the target surface being monitored, and therefore spike suppression is released in step 824, thereby allowing the true 4-20 mA current signal to be used as the output current in step 812. In this instance however, because the spike is no longer present in the output proximity signal, the output current will be at or near its normal vibration current level, and thus no shutdown alarm is triggered.

To determine whether the shutdown criteria have been met, step 822 preferably utilizes one or more parameters that may be controlled by the user. For example, in one or more embodiments, the user selects the spike peak (i.e., magnitude level) and/or spike duration (e.g., time in milliseconds), which the method 800 then uses to calculate suppression of the 4-20 mA current signal. If peaks are detected on both sides of baseline (i.e., the spike in amplitude of the voltage output is symmetrical rather than non-symmetrical or unbalanced), suppression will be released since a real vibration condition is most likely present.

By way of example only and without limitation, assume that a spike suppression event has been detected by the processor in the digital proximity system. The processor will force the current output to the user-selected level, such as, for example, 2.6 mA, for a prescribed spike duration, such as, for example, 0.25 seconds, in step 820 to inform the control system that a spike suppression event has occurred. Vibration magnitudes greater than the prescribed spike suppression setting that last longer than the prescribed spike duration setting will be reported normally via the 4-20 mA current output. In one or more embodiments, the proximity system keeps track of the duration of the spike and releases the suppression when the spike lasts longer than the user-defined spike duration. When a spike is detected, by setting the output current to a prescribed level which is different from a normal vibration current level (and less than full-scale), the spike detection can be logged by the system even though no shutdown alarm condition has occurred. This information may be helpful for diagnostic purposes.

Figure 9:
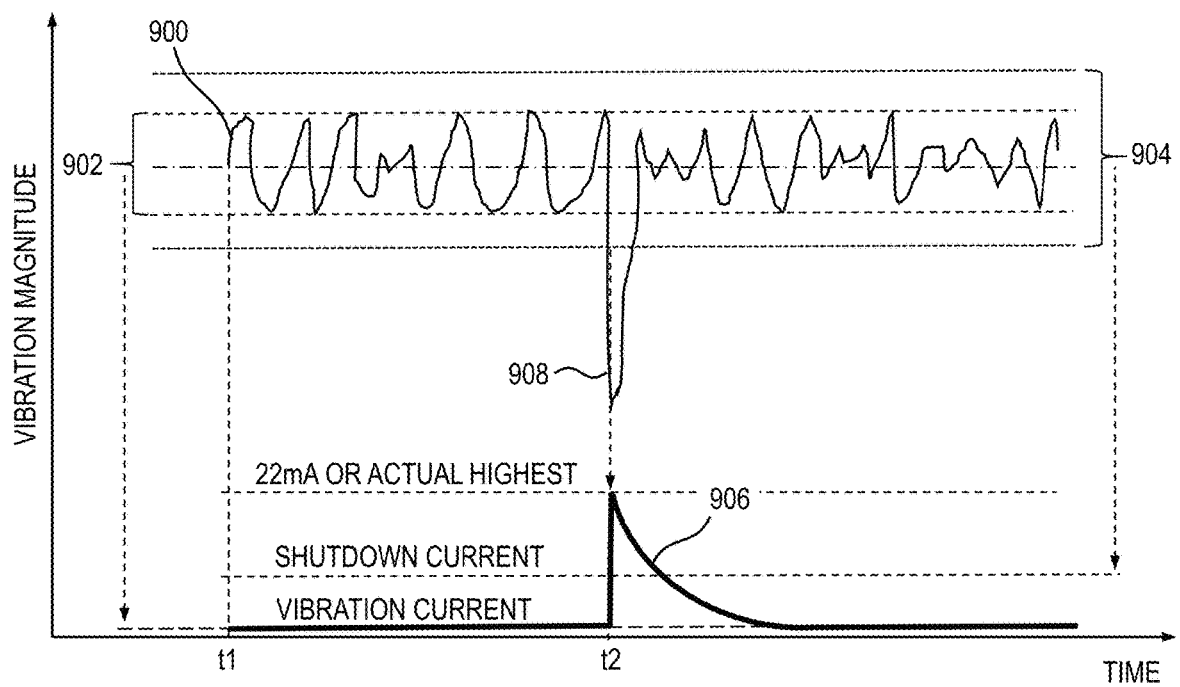
FIGS. 9-11 graphically depict exemplary current output waveforms generated by the digital proximity system for different scenarios, according to embodiments of the present invention.
Figure 10:
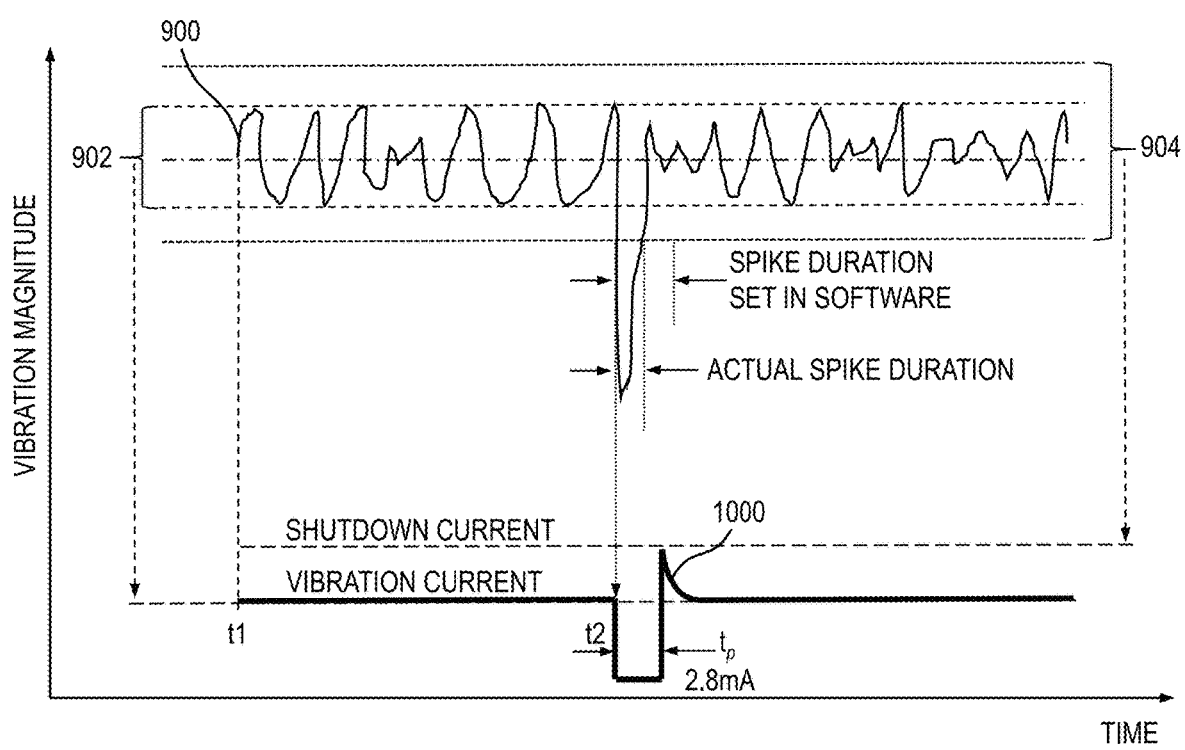
Figure 11:
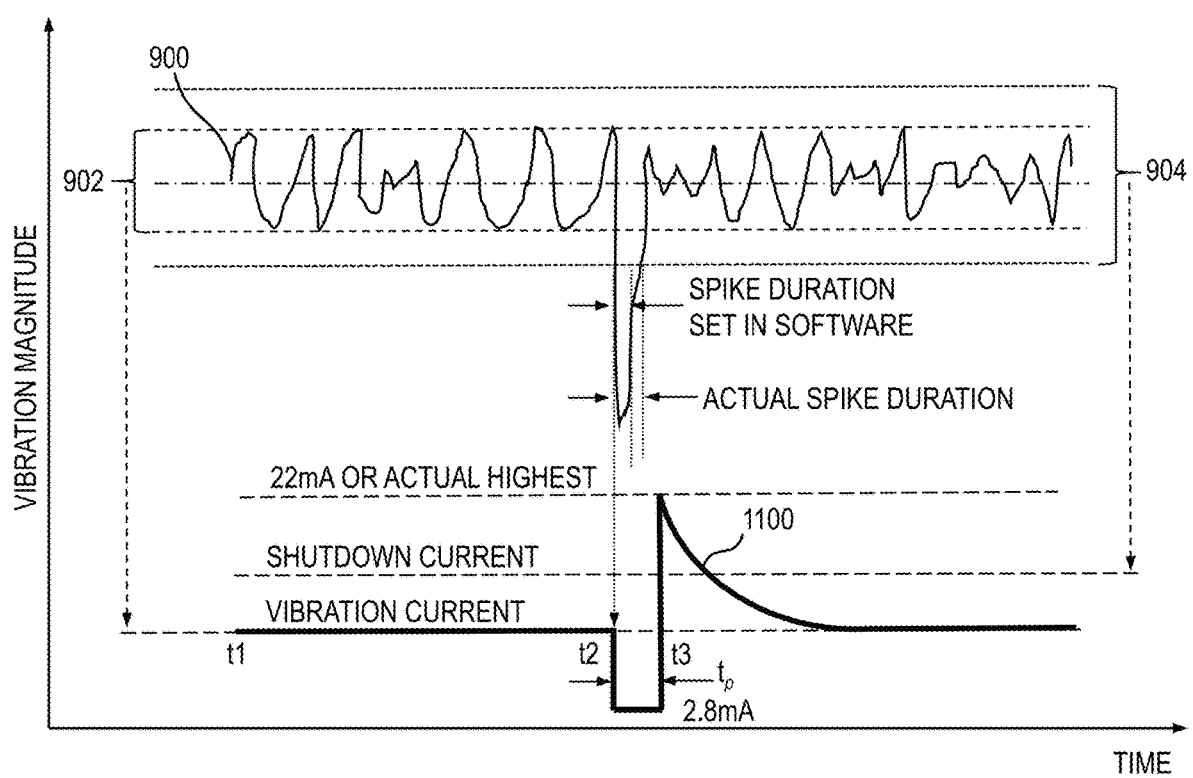

FIGS. 9-11 graphically depict exemplary current output waveforms generated by the digital proximity system for different scenarios in which the digital proximity system may be employed, according to embodiments of the invention. FIG. 9 illustrates a scenario in which spike/noise suppression is disabled. With reference to FIG. 9, an exemplary output signal 900 is shown, which may be generated by a vibration/position transmitter (e.g., 202 in FIG. 2), along with a corresponding current output 906, which may be generated as an output of the digital proximity system. A normal vibration range 902 is shown as well as a user-defined shutdown range 904. From time t1 to t2, the output signal 900 exhibits a periodic pattern indicative of normal vibration, which produces a substantially constant vibration current level in the current output signal 906. At time t2, a non-periodic spike occurs in the output signal 900 that exceeds the defined shutdown range 904. Because suppression is disabled, the current output signal 906 rises sharply to about 22 mA, or its actual highest level, thereby exceeding the shutdown current level.

FIG. 10 illustrates a scenario in which spike/noise suppression is enabled and the detected spike duration is less than the prescribed spike duration. With reference to FIG. 10, the processor in the digital proximity system detects a non-periodic spike indicative of a non-vibration induced random event at time t2 which exceeds the user-defined shutdown threshold 904. With suppression enabled, however, rather than the current output waveform 1000 rising sharply to 22 mA or its actual highest value, the processor suppresses the current output to a user-defined value of about 2.8 mA, or some other value less than full scale, for a prescribed duration, $t_p$, which may be about 0.25 seconds or some other value. In this scenario, the detected spike duration is less than the spike duration set in software (e.g., defined by the user), and therefore when the suppression period invoked by the digital proximity system has ended, the spike event has passed and the output signal 900 resumes its periodic pattern indicative of normal vibration. As apparent from FIG. 10, with suppression enabled and the duration of the spike is less than the defined spike duration period, the current output 1000 remains below the shutdown current level, and thus no alarm is generated in the digital proximity system; that is, the spike has been successfully suppressed.

FIG. 11 illustrates a scenario in which spike/noise suppression is enabled and the detected spike duration is greater than the prescribed spike duration. In this scenario, a non-periodic spike exceeding the defined shutdown threshold 904 is detected at time t2. With suppression enabled, the processor suppresses the output current 1100 to a prescribed value of about 2.8 mA, or some other value less than full scale (and preferably less than the normal vibration current level), for a prescribed duration, $t_p$, which may be about 0.25 seconds or some other value. It is to be appreciated that embodiments of the invention are not limited to any specific spike peak value or spike duration.

In this scenario, the spike lasts longer than the spike duration set in software (e.g., defined by the user), and therefore when the suppression invoked by the proximity system is released at time t3, the spike event is still present, and hence the output current 1100 rises sharply to about 22 mA, or its actual highest level, thereby exceeding the shutdown current level. This will cause an alarm to be generated in the proximity system. Vibration amplitudes greater than the spike suppression threshold setting 904, that last longer than the spike duration setting $t_p$, will be reported normally via the 4-20 mA current output.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Those skilled in the art will appreciate that the exemplary structures discussed above can be distributed in raw form (i.e., a single wafer having multiple unpackaged chips), as bare dies, in packaged form, or incorporated as parts of intermediate products or end products that benefit from suppressing a non-vibration induced event recorded by a digital proximity system, in accordance with one or more embodiments of the invention.

An integrated circuit in accordance with aspects of the present disclosure can be employed in essentially any application and/or system where vibration detection is employed. Suitable systems and devices for implementing embodiments of the invention may include, but are not limited to, industrial equipment, such as, but not limited to, motors, compressors, generators, turbines, and other rotating machines. Systems incorporating such integrated circuits are considered part of this invention. Given the teachings of the present disclosure provided herein, one of ordinary skill in the art will be able to contemplate other implementations and applications of embodiments of the invention.

The methodologies of embodiments of the present disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module" or "system." Furthermore, embodiments of the present disclosure may take the form of a computer program product embodied in one or more computer readable medium(s) having computer readable program code stored thereon.

Any combination of one or more computer-usable or computer-readable medium(s) may be utilized. The computer-usable or computer-readable medium may be a computer-readable storage medium. A computer-readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this disclosure, a computer-readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented at least in part by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer-readable medium that can direct a computer, other programmable data processing apparatus, or other devices to function in a particular manner, such that the instructions stored in the computer-readable medium produce an article of manufacture including instructions which when executed implement the function(s)/act(s) specified in the flowchart and/or block diagram block or blocks.

Figure 12:
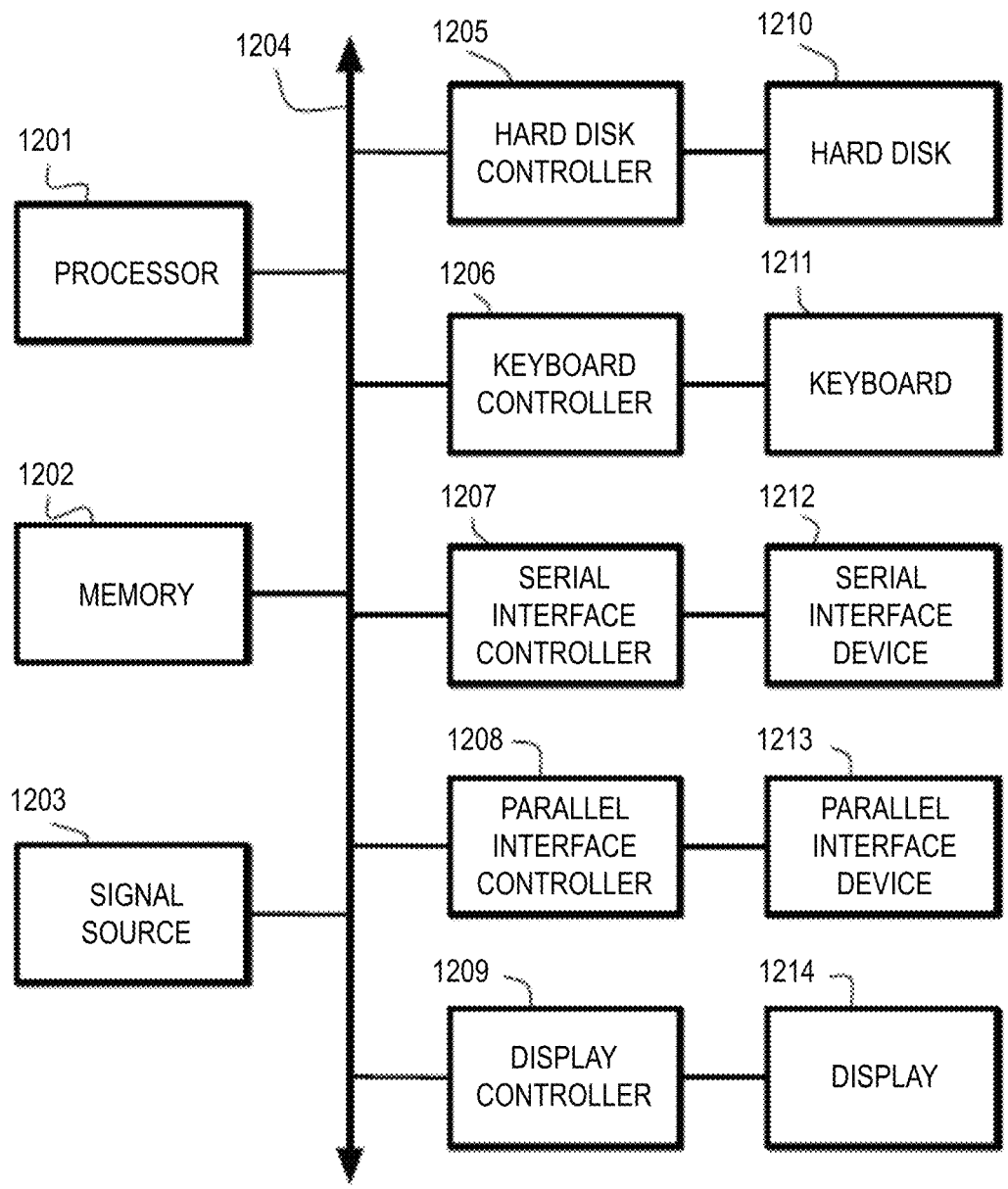
FIG. 12 is a block diagram depicting an exemplary system for suppressing an alarm condition generated by a non-vibration induced spike or event occurring in a rotating machine, according to an embodiment of the present invention.

For example, FIG. 12 is a block diagram depicting at least a portion of an exemplary computer system for suppressing noise generated by a non-vibration induced event occurring in a rotating machine, according to an embodiment of the present disclosure. The computer system shown in FIG. 12 includes a processor 1201, memory 1202, signal source 1203, system bus 1204, hard drive (HD) controller 1205, keyboard controller 1206, serial interface controller 1207, parallel interface controller 1208, display controller 1209, hard disk 1210, keyboard 1211, serial peripheral device 1212, parallel peripheral device 1213, and display 1214.

In these components, the processor 1201, memory 1202, signal source 1203, HD controller 1205, keyboard controller 1206, serial interface controller 1207, parallel interface controller 1208, display controller 1209 are connected to the system bus 1204. The hard disk 1210 is connected to the HD controller 1205. The keyboard 1211 is connected to the keyboard controller 1206. The serial peripheral device 1212 is connected to the serial interface controller 1207. The parallel peripheral device 1213 is connected to the parallel interface controller 1208. The display 1214 is connected to the display controller 1209.

In different applications, some of the components shown in FIG. 12 can be omitted. The whole system shown in FIG. 12 is controlled by computer-readable instructions, which are generally stored in the hard disk 1210, EPROM or other non-volatile storage such as software. The software can be downloaded from a network (not shown in the figure, but implied), stored in the hard disk 1210. Alternatively, software downloaded from a network can be loaded into the memory 1202 and executed by the processor 1201 to complete the function determined by the software.

The processor 1201 may be configured to perform one or more methodologies described in the present disclosure, such as the noise suppression method 800 shown in FIG. 8, illustrative embodiments of which are described herein. Hence, embodiments of the present disclosure can be implemented as a routine that is stored in memory 1202 and executed by the processor 1201 to process the signal from the signal source 1203. As such, the computer system is a general-purpose computer system that becomes a specific purpose computer system when executing the routine(s) of the present disclosure.

Although the computer system described in FIG. 12 can support methods according to the present disclosure, this system is only one example of a computer system. Those skilled of the art will understand that other computer system designs can be used to implement embodiments of the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrations of embodiments of the present invention described herein are intended to provide a general understanding of the various embodiments, and are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "upper," "lower," "front" and "back," where used, indicate relative positioning of elements or structures to each other when such elements are oriented in a particular manner, as opposed to defining absolute positioning of the elements.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for suppressing a non-periodic random event in a proximity system, the method comprising:
   receiving an output signal generated by a proximity sensor in the proximity system and monitoring at least a magnitude of the output signal;
   determining whether a spike having a magnitude exceeding a prescribed threshold value has occurred in the received output signal;
   when a spike in the received output signal is detected, setting an output of the proximity system to a prescribed level for a prescribed duration of time;
   when the prescribed duration of time has elapsed, determining whether the output signal generated by the proximity sensor meets one or more prescribed criteria indicative of a shutdown condition;
   when it is determined that the output signal generated by the proximity sensor meets said prescribed criteria indicative of a shutdown condition, setting the output of the proximity system to a level exceeding an alarm threshold of the proximity system; and
   when it is determined that the output signal generated by the proximity sensor fails to meet at least one of said prescribed criteria, thereby indicating that the spike in the output signal generated by the proximity sensor was caused by a non-vibration induced random event, releasing suppression of the output of the proximity system.

2. The method of claim 1, wherein determining whether the output signal meets said one or more prescribed criteria indicative of a shutdown condition comprises determining whether a magnitude of the spike in the received output signal exceeds a prescribed threshold value, and determining whether a duration of the spike exceeds a prescribed time.

3. The method of claim 1, wherein releasing suppression of the output of the proximity system comprises setting the output of the proximity system equal to an actual output level based on the output signal generated by the proximity sensor.

4. The method of claim 1, wherein at least one of the prescribed threshold value and the prescribed duration of time are user programmable.

5. The method of claim 1, wherein the at least one of the prescribed threshold value and the prescribed duration of time are set by a user via a graphical user interface presented to the user.

6. The method of claim 1, wherein the output signal generated by the proximity sensor is an analog proximity signal, and wherein the method further comprising:
converting the analog proximity signal into a digital signal representing the analog proximity signal; and
linearizing the digital signal to a full-scale range of the analog proximity signal to thereby enhance a resolution of the received output signal.

7. The method of claim 1, wherein a source of the non-vibration induced random event generating the spike in the output signal generated by the proximity sensor is attributable to at least one of metal fragments influencing a target surface of a rotating machine being monitored, electrical noise, radio frequency interference, and mechanical vibration unrelated to the rotating machine.

8. The method of claim 1, further comprising controlling enabling and disabling of suppression of the non-periodic random event as a function of a user-selected parameter received by the proximity system.

9. The method of claim 1, wherein the output of the proximity system comprises a standard 4-20 mA current output signal.

10. The method of claim 1, wherein the prescribed level to which the output of the proximity system is set when a spike is detected in the output signal generated by the proximity sensor is less than a level of the output signal during normal vibration of a target surface being monitored.

11. An apparatus for suppressing a non-vibration induced event in a proximity system, the apparatus comprising:
memory; and
at least one processor coupled with the memory, the at least one processor being configured: to receive an output signal generated by a proximity sensor in the proximity system and to monitor at least a magnitude of the output signal; to determine whether a spike having a magnitude exceeding a prescribed threshold value has occurred in the received output signal; to set an output of the proximity system to a prescribed level for a prescribed duration of time when a spike in the received output signal is detected; to determine whether the output signal generated by the proximity sensor meets one or more prescribed criteria indicative of a shutdown condition when the prescribed duration of time has elapsed; to set the output of the proximity system to a level exceeding an alarm threshold of the proximity system when it is determined that the output signal generated by the proximity sensor meets said prescribed criteria indicative of a shutdown condition; and to release suppression of the output of the proximity system when it is determined that the output signal generated by the proximity sensor fails to meet at least one of said prescribed criteria, thereby indicating that the spike in the output signal generated by the proximity sensor was caused by a non-vibration induced random event.

12. The apparatus of claim 11, wherein to determine whether the output signal generated by the proximity sensor meets said one or more prescribed criteria indicative of a shutdown condition, the at least one processor is further configured to determine whether a magnitude of the spike in the received output signal exceeds a prescribed threshold value, and to determine whether a duration of the spike exceeds a prescribed time.

13. The apparatus of claim 11, wherein to release suppression of the output of the proximity system, the at least one processor is further configured to set the output of the proximity system equal to an actual level based on the output signal generated by the proximity sensor.

14. The apparatus of claim 11, wherein at least one of the prescribed threshold value and the prescribed duration of time are user programmable.

15. The apparatus of claim 11, wherein the at least one processor is further configured to generate a graphical user interface for presentation to a user, the processor receiving at least one of the prescribed threshold value and the prescribed duration of time selected by the user through the graphical user interface.

16. The apparatus of claim 11, wherein the at least one processor is further configured to: receive an analog proximity signal from the proximity sensor; to convert the analog proximity signal into a digital signal representing the analog proximity signal; and to linearize the digital signal to a full-scale range of the analog proximity signal to thereby enhance a resolution of the received output signal.

17. The apparatus of claim 11, wherein the at least one processor is further configured:
to receive, as a user-selectable parameter, an enable signal; and to control enabling and disabling of suppression of the non-periodic random event as a function of the enable signal.

18. The apparatus of claim 11, wherein the prescribed level to which the output of the proximity system is set by the at least one processor when a spike is detected in the output signal generated by the proximity sensor is less than a level of the output signal during normal vibration of a target surface being monitored.

19. A system for monitoring an operational status of a rotating machine, the system comprising:
at least one proximity sensor operatively coupled with a rotating surface of the rotating machine being monitored, the proximity sensor being configured to generate an output signal indicative of a position of the proximity sensor relative to the rotating surface of the rotating machine; and
a position transmitter coupled with the at least one proximity sensor, the position transmitter comprising at least one processor configured: to receive the output signal generated by the proximity sensor and to monitor at least a magnitude of the output signal; to determine whether a spike having a magnitude exceeding a prescribed threshold value has occurred in the received output signal; to set an output of the position transmitter to a prescribed level for a prescribed duration of time when a spike in the received output signal is detected; to determine whether the output signal generated by the proximity sensor meets one or more prescribed criteria indicative of a shutdown condition when the prescribed duration of time has elapsed; to set the output of the position transmitter to a level exceeding an alarm threshold of the system when it is determined that the output signal generated by the proximity sensor meets said prescribed criteria indicative of a shutdown condition; and to release suppression of the output of the position transmitter when it is determined that the output signal generated by the proximity sensor fails to meet at least one of said prescribed criteria, thereby indicating that the spike in the output signal generated by the proximity sensor was caused by a non-vibration induced random event.

20. A non-transitory computer readable medium storing instructions that, when executed by one or more processors, cause the one or more processors:

to receive an output signal generated by a proximity sensor in a proximity system and to monitor at least a magnitude of the output signal;

to determine whether a spike having a magnitude exceeding a prescribed threshold value has occurred in the received output signal;

to set an output of the proximity system to a prescribed level for a prescribed duration of time when a spike in the received output signal is detected;

to determine whether the output signal generated by the proximity sensor meets one or more prescribed criteria indicative of a shutdown condition when the prescribed duration of time has elapsed;

to set the output of the proximity system to a level exceeding an alarm threshold of the proximity system when it is determined that the output signal generated by the proximity sensor meets said prescribed criteria indicative of a shutdown condition; and to release suppression of the output of the proximity system when it is determined that the output signal generated by the proximity sensor fails to meet at least one of said prescribed criteria, thereby indicating that the spike in the output signal generated by the proximity sensor was caused by a non-vibration induced random event.

\* \* \* \* \*